US006374256B1

(12) United States Patent
Ng et al.

(10) Patent No.: US 6,374,256 B1
(45) Date of Patent: Apr. 16, 2002

(54) METHOD AND APPARATUS FOR CREATING INDEXES IN A RELATIONAL DATABASE CORRESPONDING TO CLASSES IN AN OBJECT-ORIENTED APPLICATION

(75) Inventors: Tony Chun Tung Ng, Fremont; Timothy R. Learmont, Palo Alto, both of CA (US)

(73) Assignees: Sun Microsystems, Inc., Palo Alto, CA (US); Baan Development, B.V., Barneveld (NL)

( * ) Notice: Subject to any disclaimer, the term of this patent is extended or adjusted under 35 U.S.C. 154(b) by 0 days.

(21) Appl. No.: 09/106,188

(22) Filed: Jun. 29, 1998

Related U.S. Application Data (60) Provisional application No. 60/068,415, filed on Dec. 22, 1997.

(51) Int. Cl.[7] .............................................. G06F 17/30
(52) U.S. Cl. ...................... 707/103; 707/100; 707/102; 707/4
(58) Field of Search .............................. 707/103, 2, 1, 707/100, 102, 4

(56) References Cited

U.S. PATENT DOCUMENTS

| | | | |
|---|---|---|---|
| 4,589,092 A | | 5/1986 | Matick ........................ 711/207 |
| 5,043,876 A | | 8/1991 | Terry .......................... 707/201 |
| 5,261,069 A | | 11/1993 | Wilkinson et al. ........... 711/145 |
| 5,263,155 A | | 11/1993 | Wang ............................. 707/8 |
| 5,280,612 A | | 1/1994 | Lorie et al. ..................... 707/8 |
| 5,291,583 A | * | 3/1994 | Bapat .......................... 707/103 |
| 5,301,297 A | | 4/1994 | Menon et al. ............... 711/114 |
| 5,404,510 A | * | 4/1995 | Smith et al. .................... 707/2 |
| 5,499,371 A | | 3/1996 | Henninger et al. ............. 717/2 |
| 5,504,885 A | | 4/1996 | Alashqur ........................ 717/5 |
| 5,542,078 A | * | 7/1996 | Martel et al. ............... 707/103 |
| 5,574,882 A | | 11/1996 | Menon et al. ............... 711/114 |
| 5,596,746 A | | 1/1997 | Shen et al. .................. 707/101 |

(List continued on next page.)

FOREIGN PATENT DOCUMENTS

| | | |
|---|---|---|
| WO | WO 95/03586 | 2/1995 |
| WO | WO 95/04960 | 2/1995 |
| WO | WO 97/03406 | 1/1997 |

OTHER PUBLICATIONS

Fitsilis, P., et al., "Producing Relational Database Schemata From an Object Oriented Design," 1994, IEEE, pp. 251–257.

"The Enterprise Objects Framework," Enterprise Objects Framework: Building Reusable Business Objects, Jul. 1994, pp. 1–13.

Arnold and Gosling, "The Java™ Programming Language", Addison–Wesley 1997.

T. Lindholm and F. Yellin, "The Java Virtual Machine Specification" Second Edition, Apr. 1999, pp. 1–473.

"Customizable Four Pane Layout for Database Table Definition," Dec. 1992, pp. 268–269.

(List continued on next page.)

*Primary Examiner*—Jean R. Homere
*Assistant Examiner*—Greta Robinson
(74) *Attorney, Agent, or Firm*—Finnegan, Henderson, Farabow, Garrett & Dunner, L.L.P.

(57) ABSTRACT

An improved object-database mapping tool is provided that generates indexes in a database corresponding to classes in an object-oriented application. Initially, the mapping tool maps each class in an object-oriented application to a table in a database. A user, for example, selects one or more fields to be indexed from one or more classes. The tool determines if the selected fields correspond to the columns in more than one table in the database. If the selected fields correspond to a plurality of tables in the database then the mapping tool generates a plurality of indexes. Alternatively, if the fields correspond to one table in the database then the mapping tool generates a single index.

10 Claims, 10 Drawing Sheets

U.S. PATENT DOCUMENTS

| | | | |
|---|---|---|---|
| 5,615,362 A | | 3/1997 | Jensen et al. .................. 707/3 |
| 5,706,506 A | | 1/1998 | Jensen et al. .................. 707/3 |
| 5,732,257 A | * | 3/1998 | Atkinson et al. .............. 707/4 |
| 5,742,813 A | | 4/1998 | Kavanagh et al. ............. 707/8 |
| 5,765,159 A | | 6/1998 | Srinivasan .................. 707/102 |
| 5,774,731 A | | 6/1998 | Higuchi et al. ............. 710/200 |
| 5,797,137 A | * | 8/1998 | Golshani et al. ............... 707/4 |
| 5,812,134 A | | 9/1998 | Pooser et al. ................ 345/848 |
| 5,829,006 A | | 10/1998 | Parvathaneny et al. ..... 707/101 |
| 5,835,910 A | | 11/1998 | Kavanagh et al. .......... 707/103 |
| 5,850,544 A | | 12/1998 | Parvathaneny et al. ..... 707/101 |
| 5,857,197 A | | 1/1999 | Mullins ...................... 707/103 |
| 5,864,856 A | * | 1/1999 | Young ........................ 707/100 |
| 5,878,411 A | | 3/1999 | Burroughs et al. ............ 707/4 |
| 5,878,419 A | | 3/1999 | Carter ......................... 707/10 |
| 5,893,108 A | | 4/1999 | Srinivasan et al. ......... 707/103 |
| 5,907,846 A | | 5/1999 | Berner et al. ............... 707/103 |
| 5,937,409 A | | 8/1999 | Wetherbee .................. 707/103 |
| 6,003,040 A | | 12/1999 | Mital et al. .................. 707/103 |
| 6,009,428 A | | 12/1999 | Kleewein et al. ............. 707/10 |
| 6,038,565 A | * | 3/2000 | Nock .......................... 707/101 |
| 6,163,775 A | * | 12/2000 | Walaschin et al. ............. 707/3 |
| 6,163,776 A | * | 12/2000 | Periwal ......................... 707/4 |
| 6,175,837 B1 | * | 1/2001 | Sharma et al. .............. 707/103 |

OTHER PUBLICATIONS

H. Bank, "OQL," Sep. 15, 1997 (Rev. 0.11), pp. 1–7.

"Applications in Java and Extended Java," Sep. 28, 1998, pp. 1–21.

"Sun Simplifies Database Programming with Java Blend," Aug. 21, 1997, pp. 1–3.

S. Wang, "Improvement of Concurrency Control Within Object–Oriented Database Systems," Apr. 5, 1990, IEEE, pp. 68–70.

S. Heiler and S. Zdonik, "Object Views: Extending the Vision," 1990 IEEE, pp. 86–93.

D. Agrawal, A. Bernstein, P. Gupta, and S. Sengupta, "Distributed Multi–Version Optimistic Concurrency Control for Relational Database," Mar. 1986, pp. 416–421.

X. Qian and L. Raschid, "Query Interoperation Among Object–Oriented and Relational Databases," Mar. 6, 1995, IEEE, pp. 271–278.

S. Gantimahapatruni and G. Karabatis, "Enforcing Data Dependencies in Cooperative Information Systems," May 12, 1993, IEEE, pp. 332–341.

IBM Technical Disclosure Bulletin, vol. 38, No. 01, Jan. 1995, Fast and Secure Stored Procedures for a Client/Server DBMS, pp. 79–82.

A. Alashqur and C. Thompson, "O–R Gateway: A System for Connecting C++ Application Programs and Relational Databases," Aug. 10, 1992, pp. 151–169.

R. Ahad and T. Cheng, Hewlett–Packard Journal 44 Jun. 1993, No. 3, "HP OpenODB: An Object–Oriented Database Management System for Commercial Applications," pp. 20–30.

TOPLink, "The Industry Standard for Persistence Product, A White Paper: The Object People", 1997.

IBM Technical Disclosure Bulletin, vol. 37, No. 08, Aug. 1994, "Automatically Revising Function Prototypes in C and C++ Implementations of System Object Model Classes," pp. 363–365.

C. Kleissner, "Enterprise Objects Framework, A Second Generation Object–Relational Enabler," Jun. 1995, pp. 455–459.

"The Enterprise Objects Framework," Jul. 1994, pp. 1–12.

SQL Tutorial: Introduction to Structured Query Langage, Version 3.63 (May 1998), URL http://w3.one.net/~jhoffman/sqltut.htm#Compound Conditions.

The JDBC Database Access API (Apr. 1998), URL http://java.sun.com/products/jdbc.

O'Brien, Stephen K., "Turbo Pascal 5.5: The Complete Reference", Osborne/McGraw–Hill (1989), pp. 500–522.

* cited by examiner

METHOD AND APPARATUS FOR CREATING INDEXES IN A RELATIONAL DATABASE CORRESPONDING TO CLASSES IN AN OBJECT-ORIENTED APPLICATION

RELATED APPLICATIONS

The following identified U.S. patent applications are relied upon and are incorporated by reference in their entirety this application.

Provisional U.S. patent application Ser. No. 60/068,415, entitled "System and Method for Mapping Between Objects and Databases", filed on Dec. 22, 1997.

U.S. patent application Ser. No. 09/106,186 now U.S. Pat. No. 6,175,487, entitled "Object Relational Mapping Tool That Processes Views", and filed on the same date herewith.

U.S. patent application Ser. No. 09/105,957, entitled "Evolution Of Object-Relational Mapping Through Source Code Merging", and filed on the same date herewith.

U.S. patent application Ser. No. 09/105,957, entitled "Integrating Both Modifications to an Object Model and Modifications to a Database into Source Code by an Object-Relational Mapping Tool," and filed on the same date herewith.

U.S. patent application Ser. No. 09/106,210, entitled "Rule-Based Approach to Object-Relational Mapping Strategies", and filed on the same date herewith.

U.S. patent application Ser. No. 09/106,212 now U.S. Pat. No. 6,268,850, entitled "User Interface for the Specification of Lock Groups", and filed on the same date herewith.

U.S. patent application Ser. No. 09/106,119 now U.S. Pat. No. 6,240,413, entitled "A Fine-Grained Consistency Mechanism for Optimistic Concurrency Control Using Lock Groups", and filed on the same date herewith.

U.S. patent application Ser. No. 09/106,211 now abandoned, entitled "User Interface for the Specification of Index Groups Over Classes", and filed on the same date herewith.

U.S. patent application Ser. No. 09/106,190 now U.S. Pat. No. 6,243,707, entitled "Method and Apparatus for Loading Stored Procedures in a Database Corresponding to Object-Oriented Data Dependencies", and filed on the same date herewith.

U.S. patent application Ser. No. 09/105,046 now U.S. Pat. No. 6,279,008, entitled "An Integrated Graphical User Interface Method and Apparatus for Object-to-Database and Database-to-Object Mapping", and filed on the same date herewith.

U.S. patent application Ser. No. 09/105,955, entitled "Methods and Apparatus for Efficiently Splitting Query Execution Across Client and Server in an Object-Relational Mapping", and filed on the same date herewith.

BACKGROUND OF THE INVENTION

1. Field of the Invention

This invention generally relates to database systems for computers and, more particularly, to an apparatus and methods for creating indexes in a relational database corresponding to classes in an object-oriented application.

2. Description of the Related Art

Object-database mapping tools assist in integrating tables in a database to corresponding classes in an object-oriented application. Conventional object-database mapping tools receive class definitions from an object-oriented application and automatically generate code, typically stored in a database schema, to create tables and other structures for the database. The tables and structures in the database are used to hold data corresponding to objects generated by an object-oriented application.

There are numerous challenges to improve the techniques for mapping object-oriented applications and databases in the object-database mapping tools. These techniques need to account for the organization of data in an object-oriented application compared with the organization of data in a database.

In an object-oriented application the skeleton of an object is a class. The class may have a number of fields used to store values or states typically used by object instances of the class. The class may also include specific methods which define how objects instantiated from each class will interact with each other and hold certain information in each of the corresponding fields. A hierarchical class structure provides an organized framework for creating objects and their relationships.

In contrast, databases have features that object-oriented applications do not possess. The database typically organizes data using one or more tables having multiple rows and columns. A data relationship is defined by the manner in which data is stored in the various rows and columns of the tables. A single table or multiple tables can be used to hold every row or record of data. A primary key includes one or more columns in a table that uniquely define each row of data. If multiple tables are used to store a data, a foreign key associates rows of data in one table with another table.

Unlike classes in an object-oriented application, databases index columns of data for fast access. Each database index is made on columns of data contained in a single table. Conventional mapping tools do not provide the object-oriented user a generalized technique for specifying how an index should be generated in a database. In many cases, the object-oriented user would have to have database programming skills to manually generate indexes in the database. This could become a complex process requiring the object-oriented user to create several indexes depending on the mapping of objects into the database. For example, the user may be required to generate several different indexes if several fields in an object correspond to several tables in a database. In these more complex situations, conventional object-database mapping tools are difficult to use. These tools require the object-oriented user to understand databases and manually generate indexes. Finding such a knowledgeable user is generally difficult. Moreover, the object-oriented user must also understand how fields in classes map to columns in tables of a database and the data processing trade-offs in generating several different indexes. For at least these reasons, optimizing data processing performance with database indexes is a difficult process using conventional object-database mapping tools. As a result, the cost and complexity of integrating object-oriented systems and databases can increase significantly.

Based on the above limitations found in conventional database and object-oriented systems, it is desirable to improve the methods and systems for creating indexes in a database corresponding to fields in an object-oriented application.

SUMMARY OF THE INVENTION

In accordance with methods and systems consistent with the present invention, an improved object-database mapping tool is provided that generates indexes in a database corresponding to classes in an object-oriented application.

Initially, the mapping tool maps each class in an object-oriented application to a table in a database. A user, for example, selects one or more fields to be indexed from one or more classes. The tool determines if the selected fields correspond to the columns in more than one table in the database. If the selected fields correspond to a plurality of tables in the database then the mapping tool generates a plurality of indexes. Alternatively, if the fields correspond to one table in the database then the mapping tool generates a single index.

BRIEF DESCRIPTION OF THE DRAWINGS

The accompanying drawings, which are incorporated in and constitute a part of this specification, illustrate an implementation of the invention and, together with the description, serve to explain the principles of the invention.

In the drawings.

DETAILED DESCRIPTION

Reference will now be made in detail to an implementation of the present invention as illustrated in the accompanying drawings. The same reference numbers will be used throughout the drawings in the following description to refer to the same or like parts.

OVERVIEW

Methods and systems designed in accordance with the present invention automatically generate indexes in a database when mapping classes in an object-oriented application to the tables in a database. A user specifies the fields in a class to index when the data corresponding to object instances of these classes are stored in the database. The user's fields selection becomes an index group. An object-oriented application accessing fields in the object instance uses the index group to improve access time to the database storing the object data.

Implementations consistent with the present invention simplify the task of creating indexes on database tables used to store data corresponding to objects of an object-oriented application. The user selects the fields in an object to be indexed and whether the indexes should be unique or non-unique. An object-database mapping tool determines how the indexes should be generated and creates a database schema containing instructions for generating the appropriate indexes and relational tables for the database. The user may then invoke the schema to generate these indexes and corresponding tables in the relational database.

In an alternative implementation, an object-database mapping tool consistent with the present invention includes a graphical user interface (GUI) that allows the user to specify how fields in an object should be indexed. For more information on a GUI-based object-database mapping tool see U.S. Pat. No. 6,279,008, entitled "An Integrated Graphical User Interface Method and Apparatus for Mapping Between Objects and Databases," which is filed on the same date herewith and incorporated herein by reference in the entirety.

ENTERPRISE SYSTEM

Systems and methods consistent with the present invention utilize a client-server environment where a client communicates with a server over a common networking protocol such as TCP/IP. These systems and methods utilize a relational database management system (DBMS) with networking features to facilitate clientserver distributed database processing techniques. Such a DBMS, for example, receives requests from a remote computer and provides results over a network. The DBMS also includes standard software development interfaces such as Structured Query Language (SQL), stored procedures, and a variety of concurrence control mechanisms. Data is stored in the DBMS in a series of tables having rows and columns. The tables can be linked together through relationships in one or more columns. The terms database or relational-database are used herein to refer to a DBMS or another type of database management system consistent with the principle of the present invention.

SQL is a standardized database language for accessing relational databases. ANSI X3H2 is the standards organization responsible for maintaining the SQL standards. Database system vendors typically include extensions and additions to the SQL standard.

Stored procedures allow users to develop software routines that manipulate tables and data in a database. Typically, stored procedures are compiled and stored in the database when the database is created. A user may indirectly invoke these stored procedures in an object-oriented application by adding, deleting, and operating on objects. The stored procedures are used to access and modify tables of data in the database corresponding to the operations performed on the objects.

Concurrency mechanisms in the database include locks and other mutual exclusion techniques to give each user a consistent view of the database. These locks and other concurrency mechanisms allow multiple users or programs to simultaneously share the same database and information. An object-oriented application indirectly uses these locks when accessing data corresponding to objects stored in the database. The locks make sure the database is consistent with the operations and modifications made when multiple applications are accessing the same objects or related objects.

Figure 1:
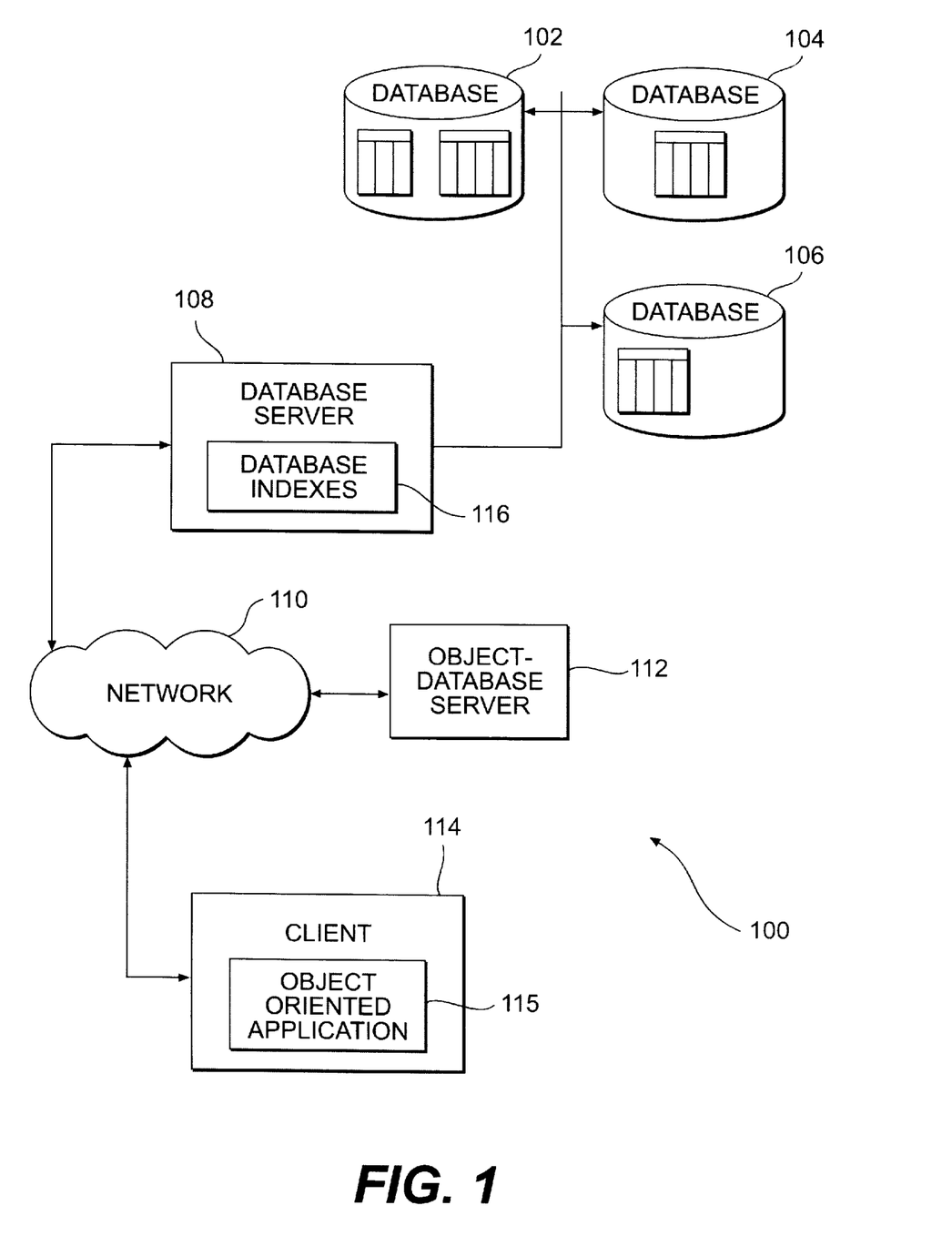
FIG. 1 is a block diagram of an enterprise system integrating object-oriented applications and a database in accordance with one implementation consistent with the present invention.

FIG. 1 is a block diagram of an enterprise system 100 integrating object-oriented applications and a database. Enterprise system 100 includes databases 102, 104, 106 and a network 110 connecting an object-database server 112, a database server 108, and a client 114. Network 110 can be a combination of networks including the Internet, corporate intranets, and other networks compatible with a networking protocol such as TCP/IP. Within database server 108, database indexes 116 are generated consistent with systems and methods of the present invention.

Databases 102, 104 and 106 include database tables corresponding to classes used in an object-oriented application. Classes associated with a database are considered "persistence-capable" classes. The objects representing these persistence-classes can be either persistent objects or transient objects depending how they are instantiated. If an object is a persistent instance of a persistent-capable class, the object is stored in the database and is accessible to many different applications. Alternatively, if an object is a transient instance of a persistence-capable class, the object exists only while the application which instantiated the object is executing.

Object-database server 112 provides a conduit between a relational database connected to database server 108 and object-oriented applications, such as an object-oriented application 115 on client 114. In general, object-oriented applications that access persistent objects send requests written in an object-oriented language over network 110 to object-database server 112. Object-server database 112 translates the object-oriented requests to the appropriate database instructions and sends the instructions over network 110 to database server 108 for further database processing. Object-database server 112 may also provide a response back to the object-oriented application if results are generated during the database operation. Database server 108 provides database services to object-database server 112 and client 114. Database server 108 accesses data stored on databases 102, 104, and 106 in response to database instructions from object-database server 112. Alternatively, object-database server 112 and database server 108 may be on the same computer system or in different parts of a network other than those areas discussed above.

Figure 2:
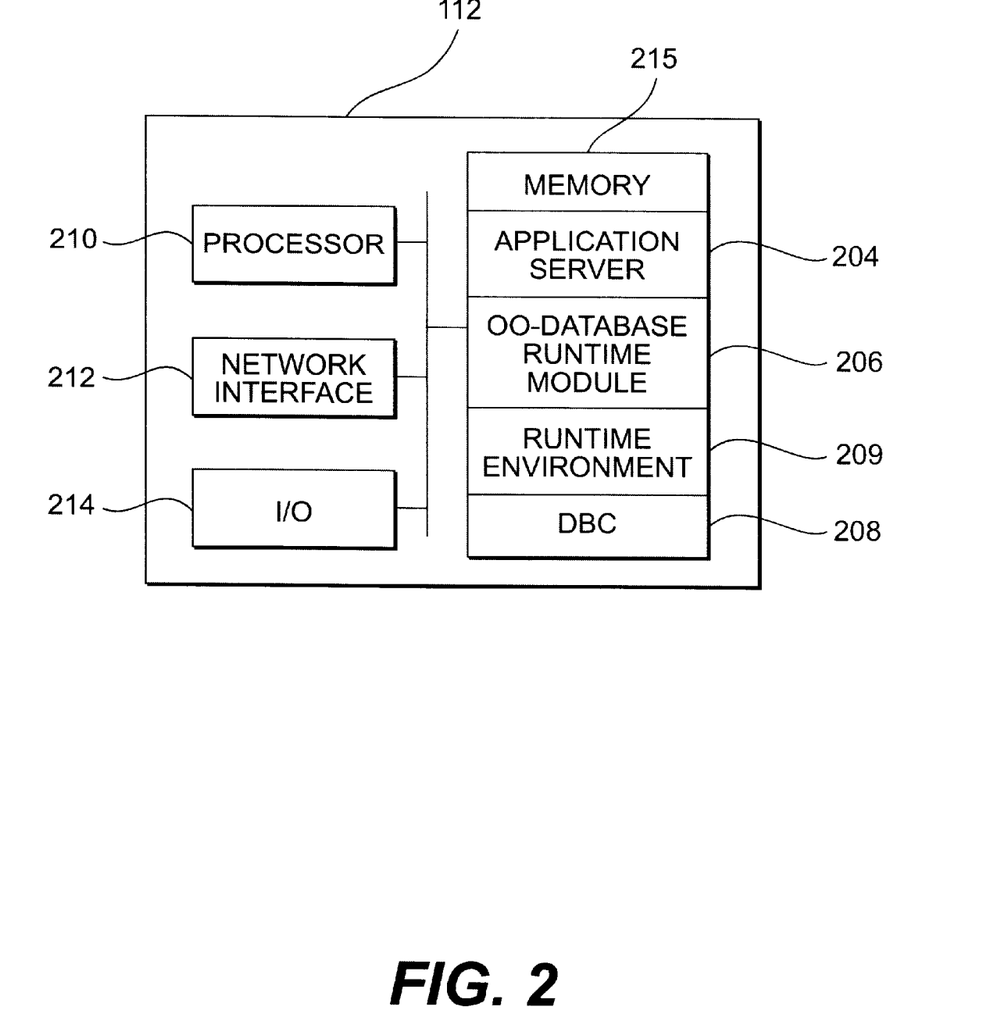
FIG. 2 is a block diagram of the subsystems associated with object-database server.

FIG. 2 is a block diagram of the subsystems associated with object-database server 112. Object-database server 112 includes a processor 210, a network interface 212, an input/output subsystem (I/O) 214, and a memory 215. Processor 210 executes instructions associated with applications contained in memory 215 and transmits information over an interconnect to other subsystems in object-database server 112. I/O 214 is an interface used to couple object-database server 112 with devices such as a keyboard, a mouse, a display device, and any other I/O device useful in operating and managing object-database server 112.

Memory 215 includes an application server 204, an object-oriented database runtime module 206, a runtime environment 209 and a database connectivity (DBC) module 208. Application server 204 stored in memory 215 receives requests to access objects stored on databases 102, 104, and 106. Server 112 receives these database requests over network 116 from client 114 executing object-oriented application 115. These requests typically involve manipulating tables of information stored in one or more databases associated with database server 108. Object-oriented database runtime module 206 converts the object-oriented requests into database commands.

Object-oriented database runtime module 206 receives object-oriented instructions, such as bytecodes compatible with the Java™ programming language, to access data stored in a database. Runtime environment 209 process the object-oriented instructions for execution on processor 210.

Runtime environment 209 may include a virtual machine (VM) and a corresponding development kit (DK) having object oriented class libraries. Some instructions may be interpreted by a VM and executed on processor 210. A VM simulates a processor and executes on many different hardware platforms. In one implementation, runtime environment 209 is the Java Runtime Environment having a Java™ virtual machine (JVM) and the Java™ Foundation Classes (JFC) as the development kit (DK). The Java™ Virtual Machine (JVM) is one virtual machine that promotes platform independent computing using the Java™ programming language.

Other database related instructions may use database connectivity module DBC 208 to connect object-oriented database runtime module 206 with database information. DBC 208 provides an application programming interface (API) for programmers to access a database. For example, the JDBC™ database connectivity module is one type of DBC 208 that provides an interface between Java™ applications and a database. JDBC™ database connectivity module is a Java™ application program interface (API) for executing structured query language (SQL) statements. It consists of a set of classes and interfaces written in the Java™ programming language. It provides a standard API for tool/database developers and makes it possible to write database applications using a pure Java™ API. JDBC™ is described in greater detail in Hamilton, Cattell, and Fisher, *JDBC™ Database Access with Java™*, Addison-Wesley (1997), which is incorporated herein by reference. For example, DBC 208 can be used to establish a logical connection with a database, send SQL statements to the database, and process the results provided from the database. (Sun, Sun Microsystems, the Sun logo, Java™, JDBC™, and Java™-based trademarks are trademarks or registered trademarks of Sun Microsystems, Inc. in the United States and other countries.)

Figure 3:
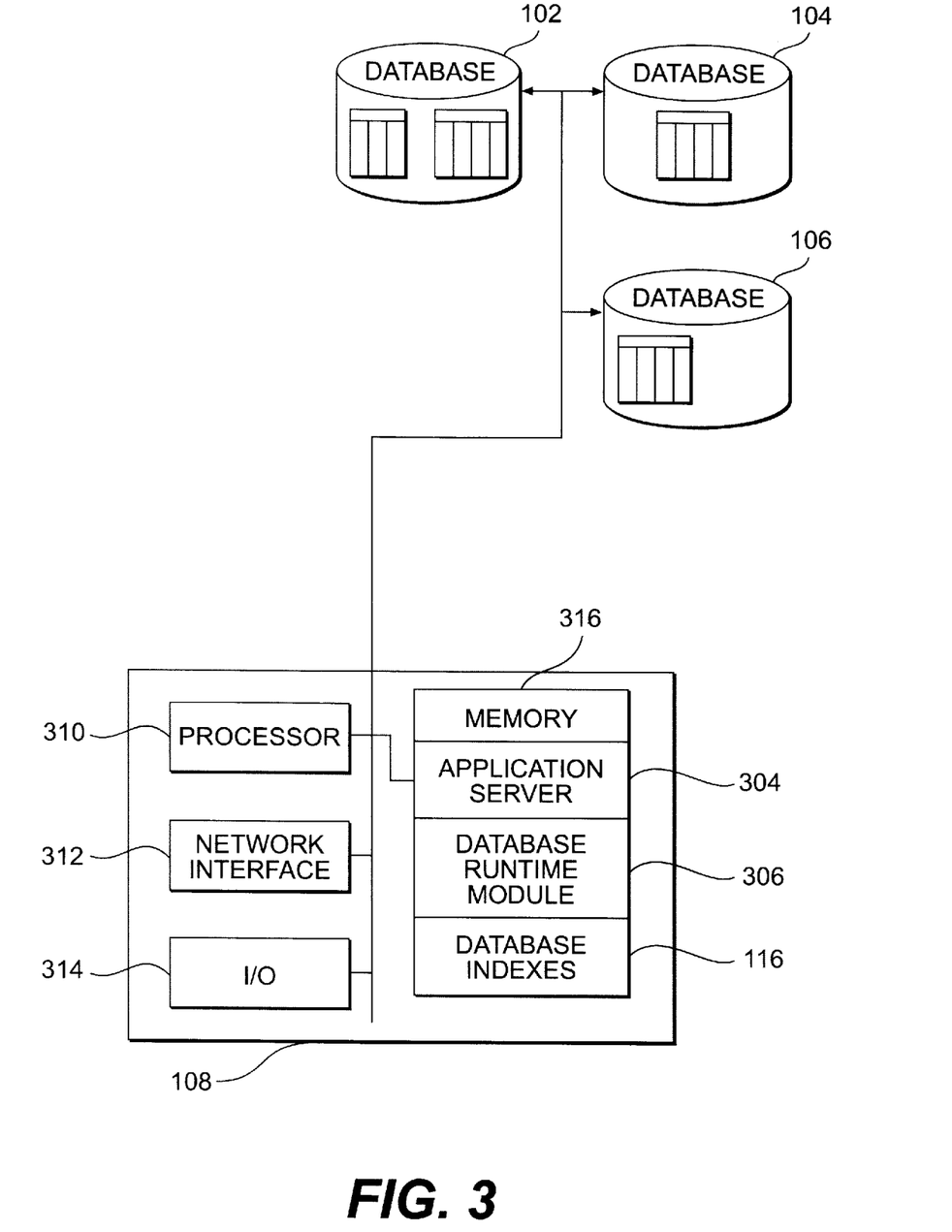
FIG. 3 is a block diagram illustrating the subsystems associated with database server.

FIG. 3 is a block diagram illustrating the subsystems associated with database server 108. Database server 108 includes a processor 310, a network interface 312, I/O 314, and a memory 316. Processor 310 executes instructions associated with applications contained in memory 316 and transmits results to other subsystems in database server 108 over a high speed interconnect or bus. I/O 314 is an interface used to couple database server 108 with devices such as a keyboard, a mouse, a display device, and any other I/O device useful in operating and managing database server 108.

Memory 316 includes an application server 304 and a database runtime module 306, and database indexes 116. Application server 304 stored in memory 316 fulfills requests for database access to databases 102, 104, and 106. The database requests are received over network 110 from object-database server 112 in a database language such as SQL. Database runtime module 306 processes the database requests and accesses data in databases 102, 104, and 106.

Figure 4:
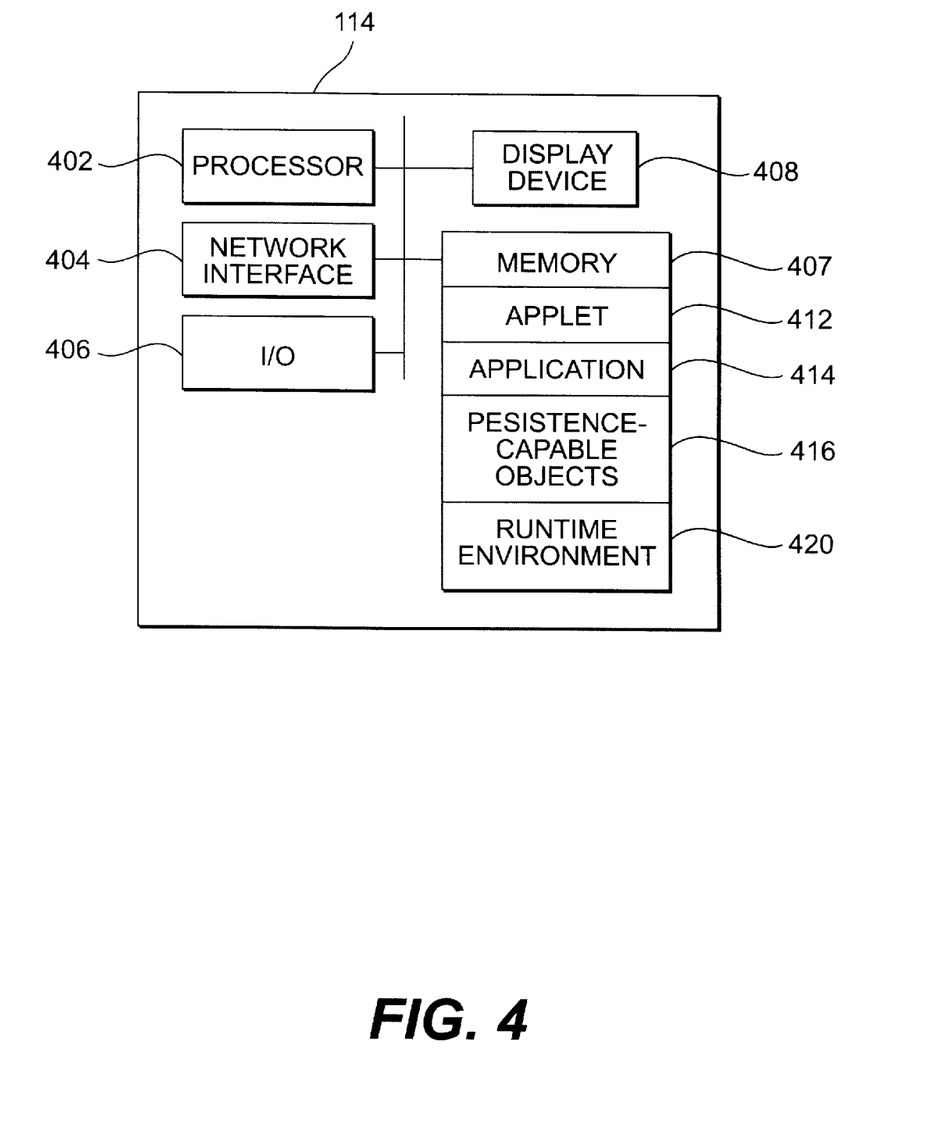
FIG. 4 is a block diagram illustrating the subsystems associated with a client used to access objects stored on a database.

FIG. 4 is a block diagram illustrating the subsystems associated with client 114 used to access objects stored in a database. Client 114 includes a processor 402, a network interface 404 coupled to network 110, an I/O interface 406, a display device 408, and a memory 407 loaded with a number of different software subsystems. These elements operate in a manner similar to the like named elements mentioned above. Display device 408 provides visual feedback to the user making requests to manipulate objects stored in databases 102, 104, and 106. Also, a user can use display device 408 to display and interact with a GUI object-database mapping tool consistent with the present invention.

Memory 407 includes an applet 412, an application 414, one or more persistence-capable objects 416, and runtime environment 420. Runtime environment 420 may include a virtual machine (VM) and a development kit (DK) having class libraries. In one implementation consistent with the present invention, applet 412 includes object-oriented code that accesses tables in a database. Alternatively, application 414 may also use object-oriented code to access tables in a database. Either applet 412 or application 414 generates persistence-capable objects 416. Applet 412 and application 414 may be developed using the Java™ programming language and processed in a Java™ runtime environment (JRE) having a Java™ virtual machine (JVM) and classes from the Java™ Foundation Classes (JFC).

Figure 5:
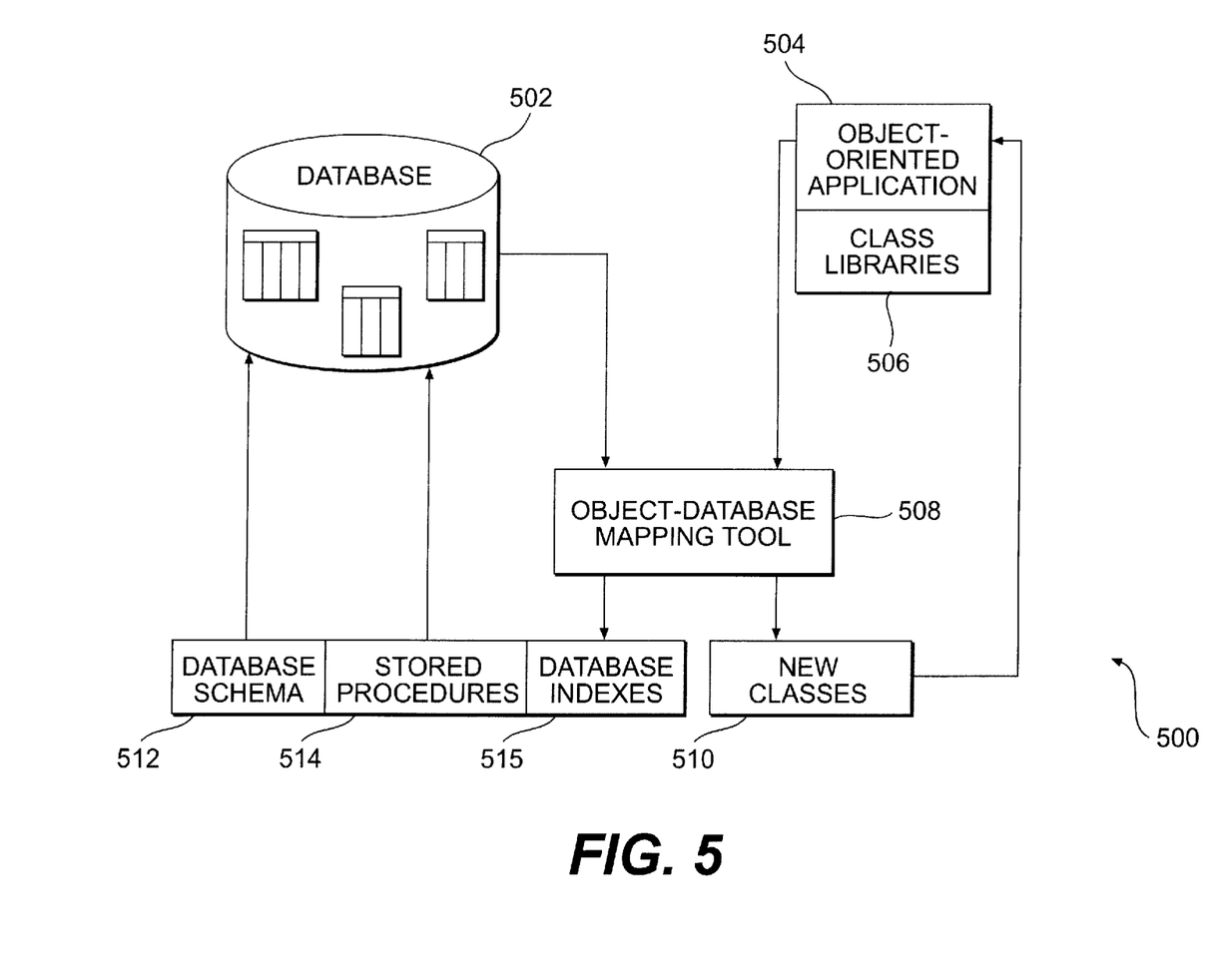
FIG. 5 is a block diagram of an exemplary object-oriented-database system with which systems and methods consistent with the present invention may be implemented.

FIG. 5 is a block diagram of an exemplary object-oriented database system 500 with which systems and methods consistent with the present invention may be implemented. System 500 includes a database 502 having tables to store data associated with objects, an object-oriented application 504, one or more class libraries 506 used to instantiate an object, an object-database mapping tool 508, a database schema 512, stored procedures 514, indexes 515, and numerous new classes 510 generated using object-database mapping tool 508.

In one implementation consistent with the present invention, object-database mapping tool 508, maps tables contained in database 502 into classes. A user provides tool 508 with data stored in tables of database 502. Tool 508 converts the tables into a number of corresponding new classes 510. In one implementation consistent with the present invention, these new classes 510 are integrated with existing class libraries 506.

Tool 508 can also map classes in class libraries 506 into the tables used in database 502. A user provides tool 508 with persistence-capable-compatible classes in class library 506 for mapping to database 502. Object-mapping tool 508 determines how each persistence-capable class in class library 506 is mapped to tables in database 502. During the class-to-database mapping, stored procedures 514, and database indexes 515 are generated and stored in database 502. Database indexes 515 are used to improve access time associated with accessing data associated with objects and stored in database 502. The class-to-database mapping process generates database schema 512 containing code and instructions for generating database tables.

CLASS-TO-TABLE MAPPING

Figure 6:
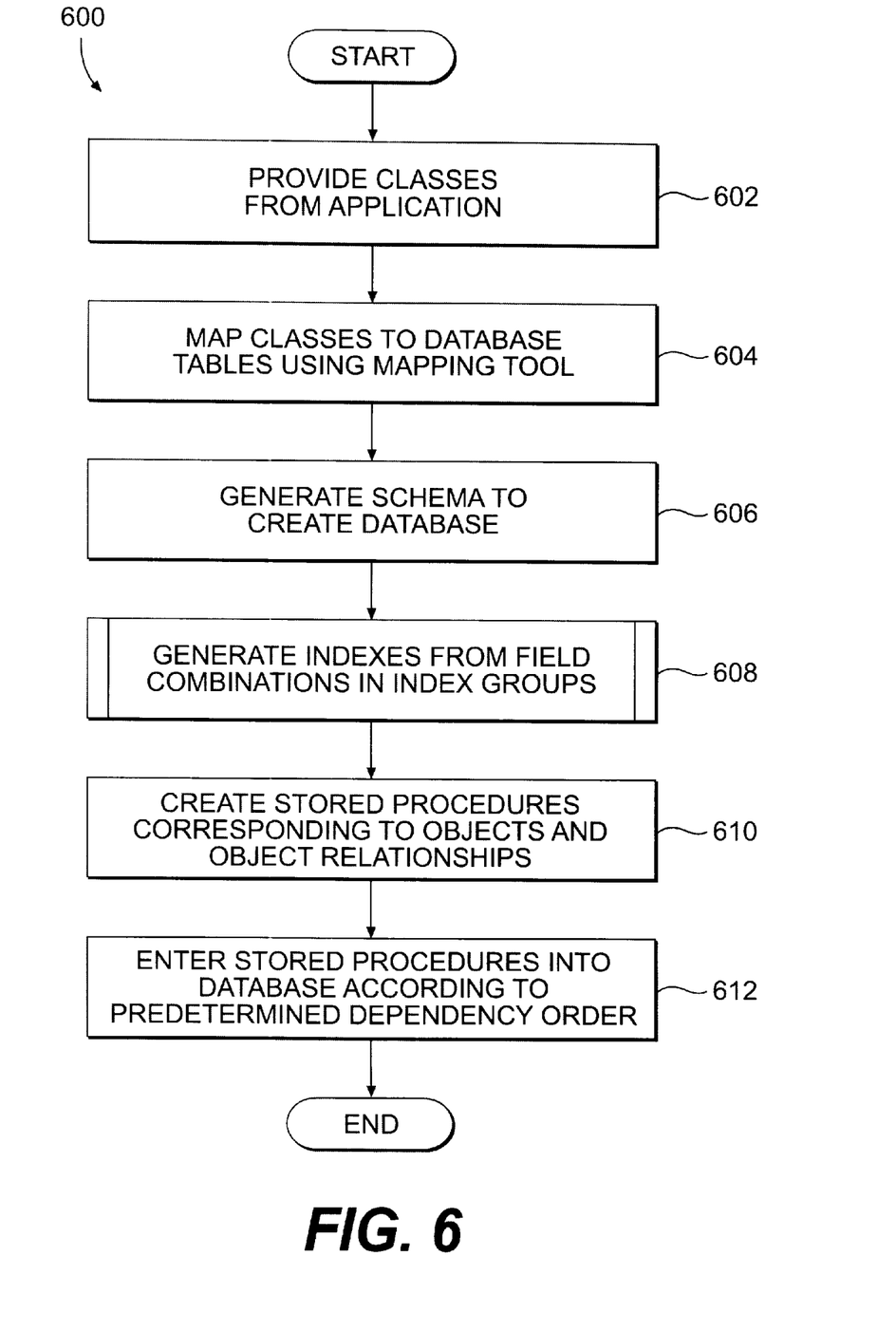
FIG. 6 is a flowchart of a method consistent with the present invention used to translate a class in an object-oriented application to table entries in a database.

FIG. 6 is a flowchart consistent with the present invention used to translate a class in an object-oriented application to table entries in a database. The user begins by providing tool 508 one or more classes corresponding to the objects in an object-oriented application (state 602). These classes have fields, methods, and other operators associated with an object-oriented language. Fields in this context are used to store different types of data or variables and methods are used to manipulate the objects derived from the corresponding classes.

A class hierarchy is also provided in the various classes defined in the object-oriented application. The class hierarchy indicates which classes are superclasses and which classes are subclasses of each other. Methods, fields and other object-oriented characteristics from a superclass are inherited by a subclass. These relationships are used to map classes into database tables and other database structures.

Tool 508 creates tables in the database having rows and columns corresponding to the one or more classes. The tables are created based upon a predetermined class-to-database mapping between classes and tables. In one implementation consistent with the present invention, the class-to-database mapping maps one class in the object-oriented application to one table in the database (state 604). Using the one-to-one class-to-database mapping technique, a class having multiple field entries is mapped to a single table wherein each column corresponds to each of the multiple fields. An additional row is added to the table for each object instance of the class stored in the database. Alternatively, more complex class-to-database mappings can be used to map classes to tables such as mapping a single class to multiple tables or mapping multiple classes to a single table.

Tool 508 generates a schema to create the tables in a database (state 606). A schema includes a description of the tables in a database and their various attributes. A user uses the schema to generate a database. Multiple schemas can be organized as separate entries in a catalogue. The catalogue names each schema with a unique label to distinguish the schemas from each other.

To improve look-up speed and performance, tool 508 allows a user to specify which fields in an object should be indexed in the database for fast access. The fields specified by the user are logically organized by tool 508 in an index group. Tool 508 analyzes each field in the index group specified by the user and generates indexes on tables in the database corresponding to the selected fields (state 608). The index is a data structure that allows rows of tables to be found quickly based on the values of one or more entries in a row. The database selects the best index to improve a query when multiple indexes are defined on the table.

In one implementation consistent with the present invention, tool 508 allows a user to specify if the index group is to be unique or can be non-unique. If a unique index group is specified, tool 508 generates one or more unique indexes for the user. A unique index requires that each row in the table contains a unique value in the specified column. Unique indices are typically faster because only one row entry in the table matches a search.

In contrast, a non-unique index group of fields selected by the user may correspond to one or more non-unique indexes in the database. By selecting a non-unique index group, tool 508 can generate non-unique indexes in the database if necessary. In contrast to the unique indexes, the non-unique indexes can contain duplicate value entries in the corresponding columns. Typically, the non-unique indexes are slower when the database has to distinguish between two or more rows with common column entries.

Tool 508 also creates one or more stored procedures 514 corresponding to operations typically performed on objects in the object-oriented application (state 610). Tool 508 automatically creates stored procedure 514 to provide basic operations useful for retrieving data stored in the database. For example, stored procedures can be generated to perform routine operations on objects such as Add, Delete, Modify and Retrieve data entries in the database.

Stored procedures 514 are entered into the database in a predetermined dependency order. If a first stored procedure calls a second stored procedure, the second stored procedure must be defined first in the database. The dependency order ensures that a stored procedure is defined in the database before it is called by an application or other stored procedure. In one implementation consistent with the present invention, the order the stored procedures are stored in the database depends on the class hierarchy and the relationships between stored procedures (state 612).

Figure 7:
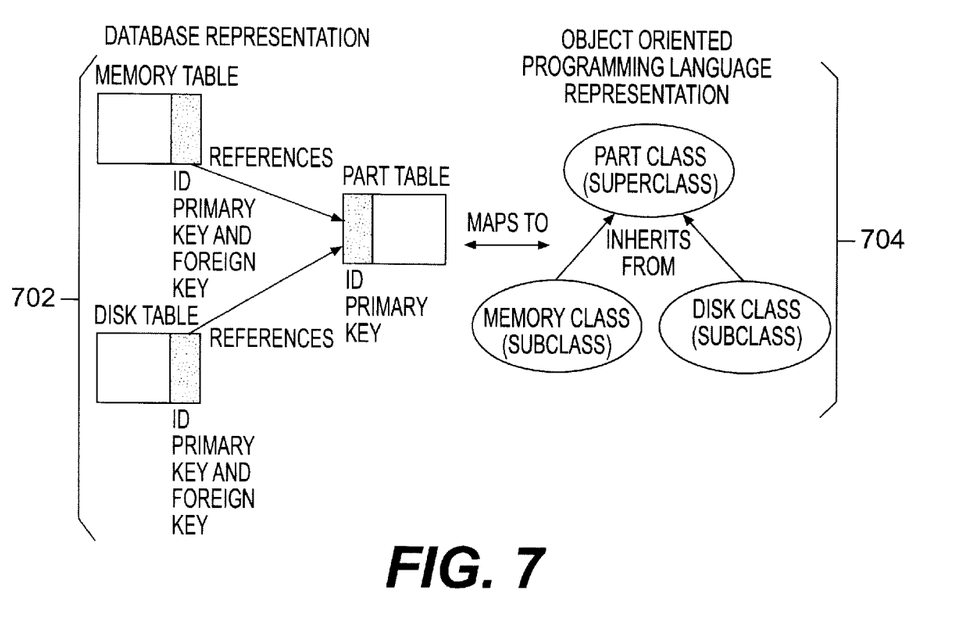
FIG. 7 is a block diagram showing table and object relationships.

FIG. 7 is a block diagram showing how object relationships are mapped to table relationships in a database. A superclass-subclass object relationship 704 is modeled in the database using foreign keys and primary keys as indicated in a corresponding superclass-subclass table relationship 702. In this example, assume an object-oriented application has a set of classes including a part class, a memory class and a disk class. The memory and disk classes are subclasses of the part class as shown in superclass-subclass object relationship 704. Because the memory and disk classes are subclasses they inherit methods, fields, and, interfaces of the part class. The memory and disk classes also may extend the parts class to define certain unique aspects of the memory and disks classes.

To represent the superclass-subclass class relationship 704, the database uses a superclass-subclass table relationship 702. Essentially, a first table is a subclass of a second table by specifying that the primary key of the first table is also a foreign key that references the primary key of the second table. In this case, the first table stores each instance of the disk class and contains a column having a primary key that is also a foreign key to the primary key in the part table. Likewise, the table used to store each instance of the memory class contains a column having a primary key that is also a foreign key to the primary key in the part table. These tables maintain referential integrity in the database when objects are added or deleted. For example, if a part object is deleted, the superclass-subclass table relationship 702 requires that entries in the memory table and disk table are deleted as well.

Figure 8:
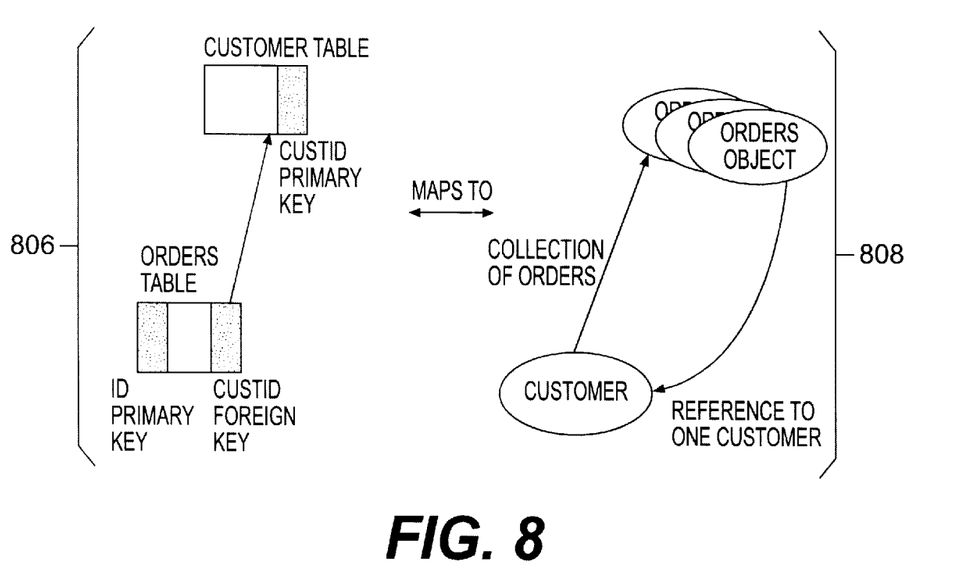
FIG. 8 is a block diagram showing a one-to-many table and one-to-many object relationship.

In addition to preserving class hierarchy, foreign keys and primary keys can also be used represent the one-to-many relationships between classes. FIG. 8 illustrates a one-to-many class relationship 808 and a one-to-many table relationship 806. For example, one-to-many class relationships 808 allows a customer object to have many order objects but each order object can only be associated with one customer object. The customer class in one-to-many class relationship 808 has a field in the class that references multiple order objects. Each order object has a field that contains a single reference to a particular customer object.

The corresponding one-to-many table relationship 806 includes an orders table having a customer identification (CUSTID) primary key column entry and a separate CUSTID foreign key column. The customer table includes a CUSTID primary key which is unique for each customer in the system. This mechanism ensures referential integrity in the object representation in the database. A deletion of a customer from the database also requires a deletion of that customer's corresponding orders in the order table based upon the CUSTID foreign key. However, deleting an order from the order table does not require a deletion of the corresponding customer from the customer table.

Figure 9:
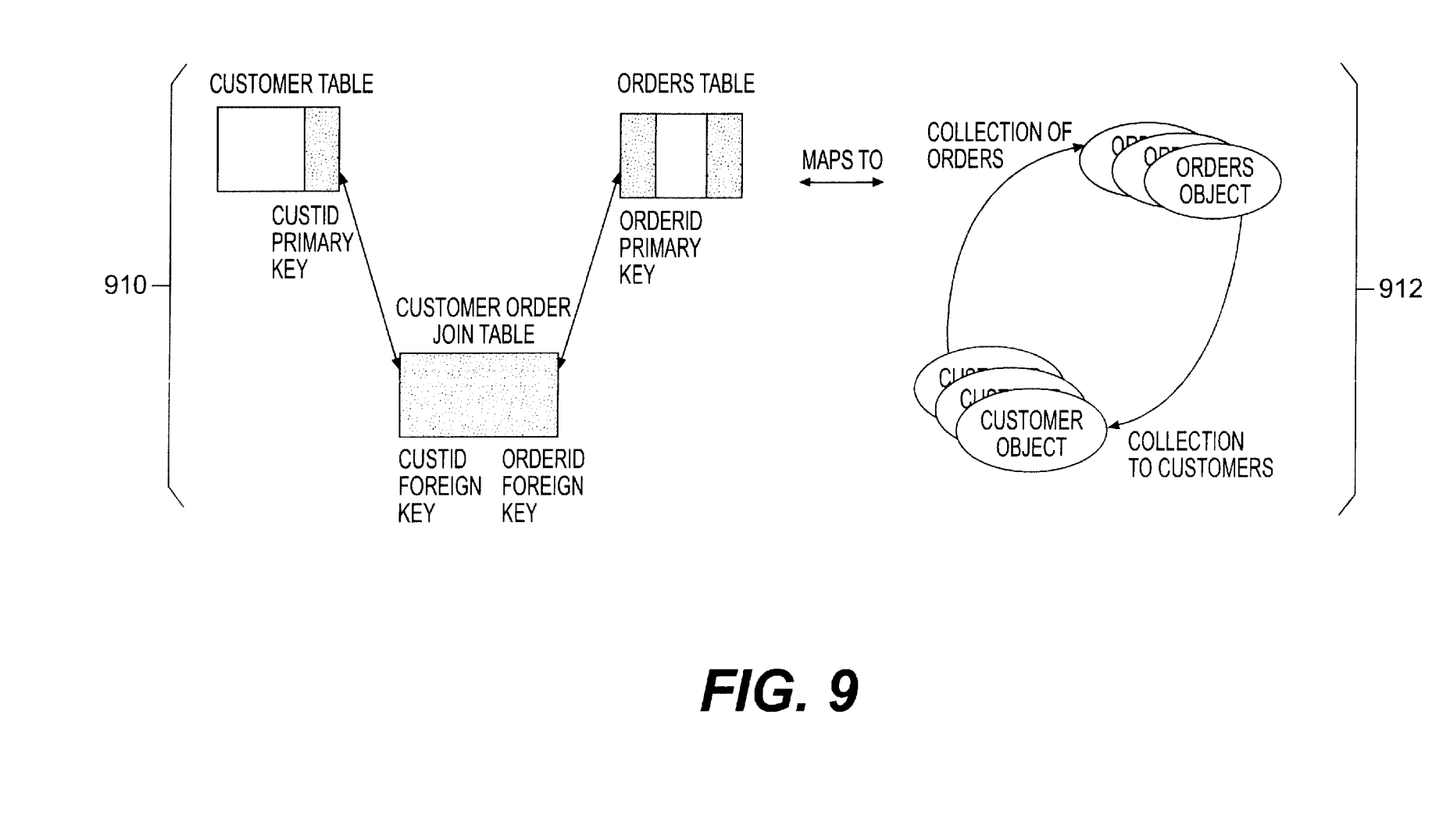
FIG. 9 is a block diagram showing a many-to-many table and many-to-many object relationship.

FIG. 9 illustrates how foreign keys and primary keys are used to represent a many-to-many class relationship 912 and many-to-many table relationship 910. Assume a customer object can reference multiple order objects and orders can be from multiple customers. The many-to-many class relationship 912 is represented in the database using a join table as shown with many-to-many table relationship 910. The join table is an intermediary table that is used to form the association between the entities in the two tables. A join table generally has two sets of columns. One set of columns forms a foreign key reference to the primary key in one table. The other set of columns forms the foreign key reference to the primary key in the other table. In this example, a customer order join table has a CUSTID foreign key mapped to a CUSTID primary key in a customer table and an ORDERID foreign key mapped to an ORDERID primary key in an orders table respectively.

TABLE-TO-CLASS MAPPING

Figure 10:
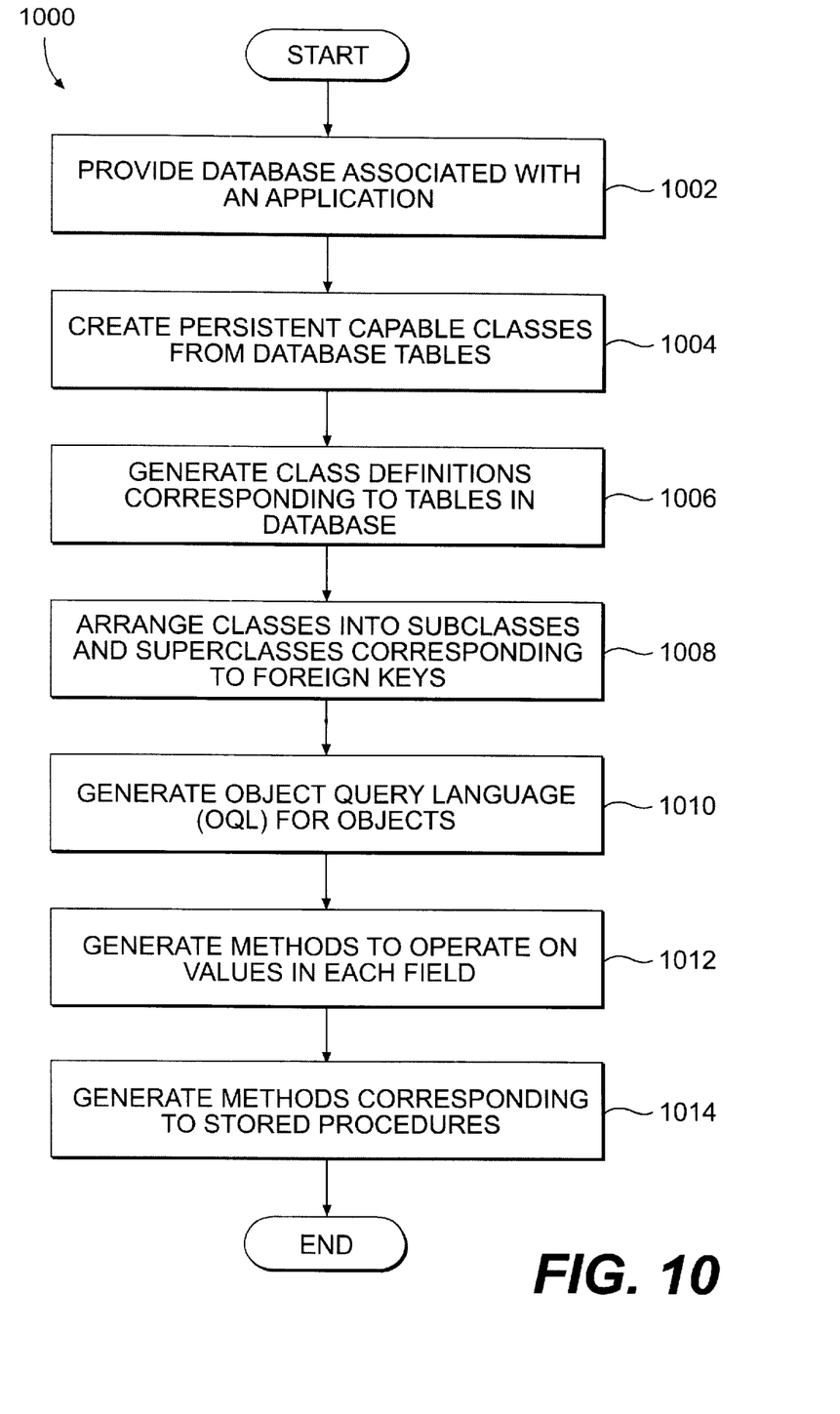
FIG. 10 is a flowchart of a method consistent with the present invention used to convert tables and other information in a database into classes in an object-oriented application.

Tool 508 also includes a table-to-class mapping method to transform tables in a database to one or more classes in an object-oriented language. FIG. 10 is a flowchart used to convert tables and other information in a database into classes in an object-oriented application. Initially, the user provides the database, and any other useful information such as stored procedures, indexes, and SQL routines related to the database, to tool 508 (state 1002). Tool 508 uses the mapping process to create persistence-capable classes from tables in the database (state 1004). In one implementation, tables in the database correspond to persistence-capable classes capable of storing objects after applications referencing the objects have completed executing.

Tool 508 generates class definitions corresponding to each table in the database (state 1006). Tool 508 analyzes relationships between tables to determine if there is a superclass-subclass relationship between tables, a one-to-many relationship between tables, or a many-to-many relationship between tables. FIGS. 7–9 outlines database table relationships and how they translate into corresponding class relationships in an object-oriented application.

A table-to-class mapping technique used to convert a table into a class is the inverse process of the class-to-table mapping technique discussed above. Tool 508 arranges the classes into the appropriate superclass and subclasses based on how foreign keys and primary keys are used in a table (state 1008). Essentially, a subclass is generated from a table that contains a column that has both the primary key for the subclass table and also a foreign key to a superclass table. For example, in FIG. 7 a superclass-subclass table relationship 702 includes a disk table having a column entry which is a primary key in the disk table column as well as a foreign key to a part table. In this example, the disk table is considered a subclass of the part class.

With respect to indexes, tool 508 uses the existing indexes in the original database and does not create more indexes unless the user specifically requests them in the table-to-class mapping.

Tool 508 also generates object query language (OQL) routines for use by objects generated from a particular classes (state 1010). The OQL routines allow a user to query objects using an object-oriented programming language interface. The OQL routines understand the relationships between classes and can do referential navigation without requiring the user to make explicit databases operations. For example, a query on a particular class will return all objects in that class as a connection of objects which match the query criteria. Users can then iterate through the collection of objects and operate on the individual objects. Alternative methods other than OQL may also be used to access objects in the database.

Tool 508 also generates default methods to operate on each field in a class (state 1012). A "get" method is created to get a field value stored in a persistent object in the tables of a database. Similarly, a "set" method is used to set a value in each field of a persistent object also stored in the database. These methods enable a user to utilize methods in an object-oriented programming language to manipulate field values in persistent objects. Alternative implementations can include different default methods as necessary for the particular application or set of applications being developed.

Tool 508 may also generate object-oriented methods corresponding to other stored procedures located in the database (state 1014). These object-oriented methods enable an object-oriented application to access precompiled stored procedure routines stored in the database.

GENERATING DATABASE INDEXES FOR CLASSES

Figure 11:
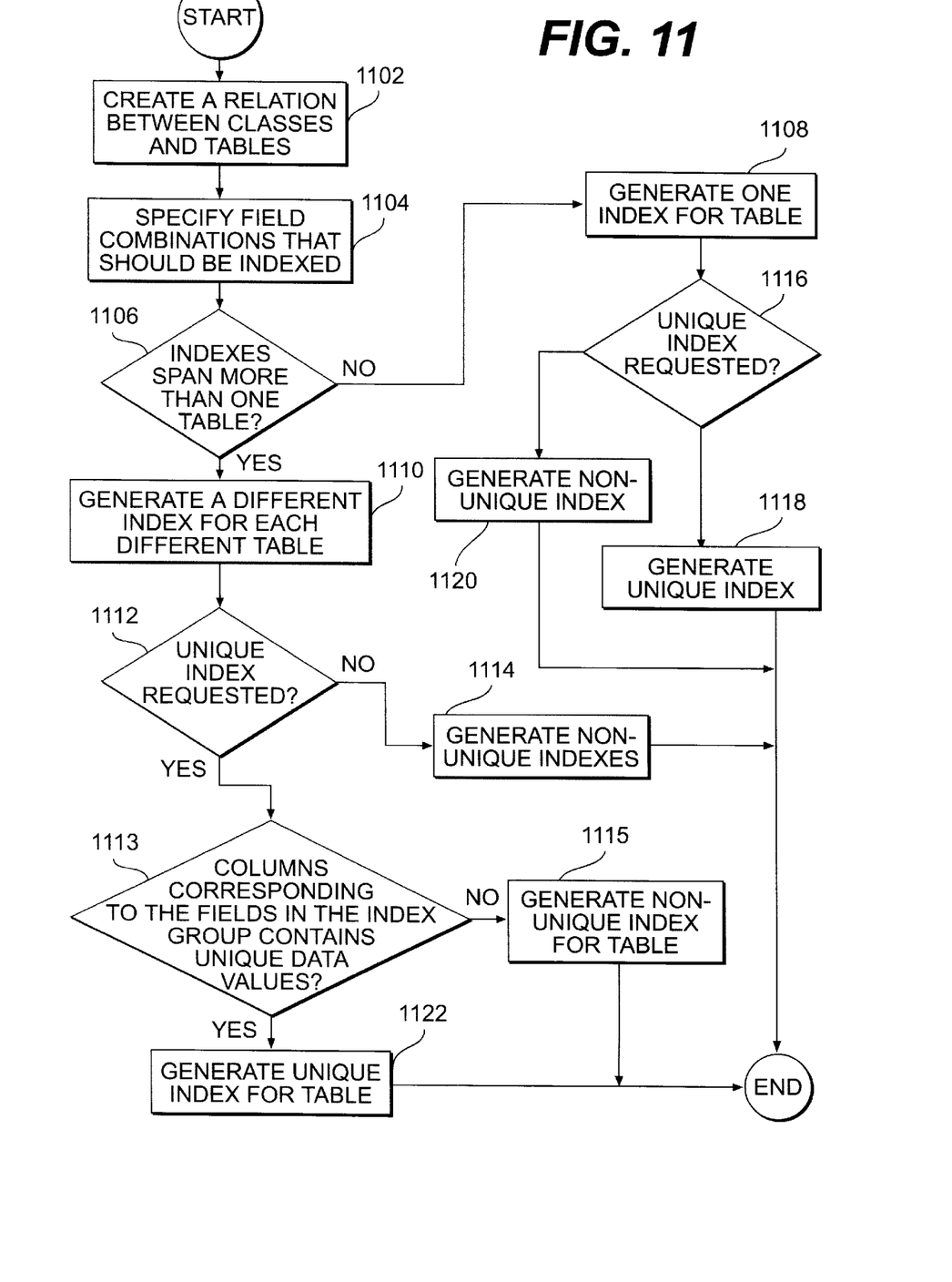
FIG. 11 is a flowchart of a method consistent with the present intention to generate indexes in a database corresponding to classes in an object-oriented application.

FIG. 11 is a flowchart used to generate indexes in a database corresponding to classes in an object-oriented application. The user specifies the fields in a class to be indexed in an index group and lets tool 508 locate the corresponding columns and tables to index in the database by specifying the fields. The collection of fields in the class or classes selected for indexing is called an index group. Generally, the user specifies an index group based on the fields commonly searched or accessed by an object-oriented application.

In the past, a conventional object-database mapping tool required the user to manually generate database indexes to improve performance. Tool 508 solves this problem and generates the database indexes automatically. Tool 508 also determines how to create multiple indexes if the fields in the classes correspond to multiple columns in multiple tables. This enables a user to request indexing on fields without specifying the implementation of indexing in the underlying database.

Initially, a predetermined class-to-table mapping technique is used to create a relation between each class in the object-oriented application and a table in the database (state 1102). FIG. 6 provides the method steps associated with translating a class to table entries in a database. In one implementation consistent with the present invention, a separate table is generated for each class in the object-oriented application. Each column in the table corresponds to a field in the particular class. Alternative implementations can generate a single table from multiple classes and fields.

The user specifies the fields in the various classes to be indexed (state 1104). In one implementation consistent with the present invention, fields used for indexing are stored in a index group. Generally, the index group includes fields from a class or classes that are commonly searched or accessed.

Tool 508 determines if fields in the index group are in a single table or span multiple tables in the database (state I 106). If all the fields selected from a class correspond to a single table, tool 508 generates a single index for the database (state 1108). The user can specify that the index group is a unique index group (state 1116). Tool 508 generates a corresponding unique index if it is well-known to the database that one or more columns in the table contain unique data values in each row (state 1118). An attempt to insert a row of information with non-unique data in a table having a unique index is rejected by the indexing mechanism associated with the underlying database.

For example, a unique index can be generated from an index group having firstname, lastname, and address fields in a class if the combination of firstname and lastname columns in the table are unique or even if just the lastname column is unique. A unique index may also be generated if one column corresponding to one field in the index group is also a primary key in the database table. Alternatively, if tool 508 is not certain at least one column in a table contains unique data, a unique index is not created (state 1120).

Fields in the index group may span one or more columns in multiple tables (state 1106). This can occur under several different circumstances. For example, this can occur if a field in a class is inherited from a superclass. It can also occur if a relationship exists between two or more classes. If fields are located in multiple tables in the database, tool 508 generates a separate index for each table (state 1110). This is necessary because databases generally only create an index for columns in the same table. Tool 508 determines that several tables are being indexed and generates the necessary indexes for the database without additional input from the user.

The user can also specify whether the index group is unique or non-unique (state 1112). If a user specifies that the index group is unique then tool 508 generates as many unique indexes as possible for each table in the database having the fields specified in the index group. If it is well-known to tool 508 that the columns corresponding to the fields in the index group contains unique data values (state 1113), tool 508 generates a unique index for the table (state 1122). Otherwise, tool 508 generates a non-unique index for the table (state 1115).

For example, assume a user specifies an index group including firstname, lastname, and PartID fields. Further, assume that the firstname and lastname columns are in one table in the database and the PartID column is in a second table in the database. Tool 508 generates two indexes. The first index is unique index if the firstname and lastname columns combine to form unique entries in a first table of the database. Likewise, the second index is also unique if the PartID column is known to contain unique information in a second table of the database. Despite a users request for a unique index group, some indexes in the group may be non-unique. Thus, if the PartID column in the second table is not known to be unique, tool 508 does not make the second index unique.

A user may also specify that the index group is non-unique (state 1112). If this is the case, then each object instance of a class may contain duplicate data in the one or more indexed fields. Similarly, multiple rows of data in the database tables can contain duplicate entries of data in the columns selected for indexing. In this case, tool 508 generates one or more indexes that allow non-unique data (state 1114).

In operation, the database uses the indexes to improve search and access times. The database system selects those indexes or combination of indexes that are likely to increase database access and performance for the user. Implementations consistent with the present invention only require the user to specify the fields in a class for indexing. Tool 508 generates code to create the appropriate index or indexes in the database.

While specific implementations have been described herein for purposes of illustration, various modifications may be made without departing from the spirit and scope of the invention. Those skilled in the art understand that the present invention can be implemented in a wide variety of software platforms and is not limited to the Java™ object oriented programming language and development environment. Furthermore, although aspects of the present invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from a network such as the Internet; or other forms of RAM or ROM. Substantially similar implementations consistent with the present invention can be created except that the various software and hardware subsystems are contained in a single computer and not distributed over a network as described and illustrated above. Accordingly, the invention is not limited to the above described embodiments, but instead is defined by the appended claims in light of their full scope of equivalents.

What is claimed is:

1. A method of generating indexes on tables in a database that maps tables to a set of classes in an object-oriented application, comprising:

selecting classes with data to be in the database;

determining whether data in the classes correspond to more than one table of the database;

generating at least one index for the data in the classes based on the determination;

determining whether the at least one index is unique; and generating at least one unique index based upon the determination.

2. A method of generating indexes on tables in a database that maps tables to a set of classes in an object-oriented application, comprising:

selecting classes with data to be indexed in the database;

determining whether data in the classes correspond to more than one table of the database;

generating at least one index for the data in the classes based on the determination;

determining whether the at least one index is unique; and generating at least one non-unique index based upon the determination.

3. An index generating system comprising:

an object-oriented application having one or more classes;

a database having one or more tables;

a processor configured to map the one or more classes in the object-oriented application to the tables in the database, select classes with data to be indexed in the database, determine whether data in the classes correspond to more than one table of the database; generate at least one index for the data in the classes based on the determination, determine whether the at least one index is unique, and generate at least one unique index based upon the determination.

4. An index generating system comprising:

an object-oriented application having one or more classes;

a database having one or more tables;

a processor configured to map the one or more classes in the object-oriented application to the tables in the database, select classes with data to be indexed in the database, determine whether data in the classes correspond to more than one table of the database; generate at least one index for the data in the classes based on the determination, determine whether the at least one index is unique, and generate at least one non-unique index based upon the determination.

5. A computer program product capable of configuring a data processor to generate indexes on tables in a database that maps the tables to classes in an object-oriented application, the computer program product comprising program code to cause the data processor to perform:

selecting classes with data to be indexed in the database;

determining whether data in the classes correspond to more than one table of the database;

generating at least one index for the data in the classes based on the determination;

determining whether the at least one index is unique; and generating at least one unique index based upon the determination.

6. A computer program product capable of configuring a data processor to generate indexes on tables in a database that maps the tables to classes in an object-oriented application, the computer program product comprising program code to cause the data processor to perform:

selecting classes with data to be indexed in the database;

determining whether data in the classes correspond to more than one table of the database;

generating at least one index for the data in the classes based on the determination;

determining whether the at least one index is unique; and generating at least one non-unique index based upon the determination.

7. An apparatus configured to generate indexes in a database that maps tables to classes in an object-oriented application, comprising:

means for mapping a set of classes in an object-oriented application to a set of tables in a database;

means for selecting classes with data to be indexed in the database;

means for determining whether data in the classes correspond to more than one table of the database;

means for generating at least one index for the data in the classes based on the determination;

means for determining whether the at least one index is unique; and means for generating at least one non-unique index based upon the determination.

8. An apparatus configured to generate indexes in a database that maps tables to classes in an object-oriented application, comprising:

means for mapping a set of classes in an object-oriented application to a set of tables in a database;

means for selecting classes with data to be indexed in the database;

means for determining whether data in the classes correspond to more than one table of the database;

means for generating at least one index for the data in the classes based on the determination;

means for determining whether the at least one index is unique; and means for generating at least one non-unique index based upon the determination.

9. A method of generating indexes in a database that corresponds to classes in an object-oriented application, comprising:

selecting fields in an object to be indexed;

determining if the indexed fields should have unique or non-unique indexes in the database; and generating a database schema capable of creating indexes based upon the determination.

10. A method of claim 9 further comprising; invoking the database schema to create a database schema to create a database with the indexes.

* * * * *

UNITED STATES PATENT AND TRADEMARK OFFICE
CERTIFICATE OF CORRECTION

PATENT NO.     : 6,374,256 B1                           Page 1 of 1
DATED          : April 16, 2002
INVENTOR(S)    : Tony Chun Tung NG et al.

It is certified that error appears in the above-identified patent and that said Letters Patent is hereby corrected as shown below:

Column 13,
Line 1, insert "indexed" after -- be --.

Signed and Sealed this

Eleventh Day of February, 2003

JAMES E. ROGAN
*Director of the United States Patent and Trademark Office*